(12) United States Patent
Ogawa

(10) Patent No.: US 11,700,429 B2
(45) Date of Patent: Jul. 11, 2023

(54) INFORMATION PROCESSING APPARATUS AND NON-TRANSITORY COMPUTER READABLE MEDIUM STORING PROGRAM

(71) Applicant: FUJIFILM Business Innovation Corp., Tokyo (JP)

(72) Inventor: Masakazu Ogawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 381 days.

(21) Appl. No.: 16/858,740

(22) Filed: Apr. 27, 2020

(65) Prior Publication Data

US 2021/0105538 A1    Apr. 8, 2021

(30) Foreign Application Priority Data

Oct. 7, 2019   (JP) ................................. 2019-184288

(51) Int. Cl.
| | | |
|---|---|---|
| H04N 21/488 | (2011.01) | |
| H04N 21/845 | (2011.01) | |
| H04N 21/44 | (2011.01) | |
| H04N 21/431 | (2011.01) | |

(52) U.S. Cl.
CPC ..... *H04N 21/4884* (2013.01); *H04N 21/4316* (2013.01); *H04N 21/44008* (2013.01); *H04N 21/8456* (2013.01)

(58) Field of Classification Search
CPC .......... H04N 21/4884; H04N 21/4316; H04N 21/44008; H04N 21/8456
See application file for complete search history.

(56) References Cited

U.S. PATENT DOCUMENTS

| | | | |
|---|---|---|---|
| 9,437,246 B2 | 9/2016 | Homma et al. | |
| 9,761,277 B2 | 9/2017 | Homma et al. | |
| 2005/0147377 A1* | 7/2005 | Kobayashi | ........... G11B 19/025 |
| 2009/0249393 A1* | 10/2009 | Shelton | ............ H04N 21/43074 |
| | | | 375/E7.076 |

FOREIGN PATENT DOCUMENTS

| | | |
|---|---|---|
| JP | 6044553 | 12/2016 |
| JP | 6217645 | 10/2017 |

* cited by examiner

*Primary Examiner* — Thai Q Tran
*Assistant Examiner* — Jose M Mesa
(74) *Attorney, Agent, or Firm* — JCIPRNET

(57) ABSTRACT

An information processing apparatus includes a display control section that performs control for displaying a list of text information provided to a motion picture in a state where a location at which the text information is not provided is also selectable, and a playback section that plays back the motion picture from a playback time point corresponding to a location selected on the displayed list in a case of playing back the motion picture to which the text information is provided.

7 Claims, 12 Drawing Sheets

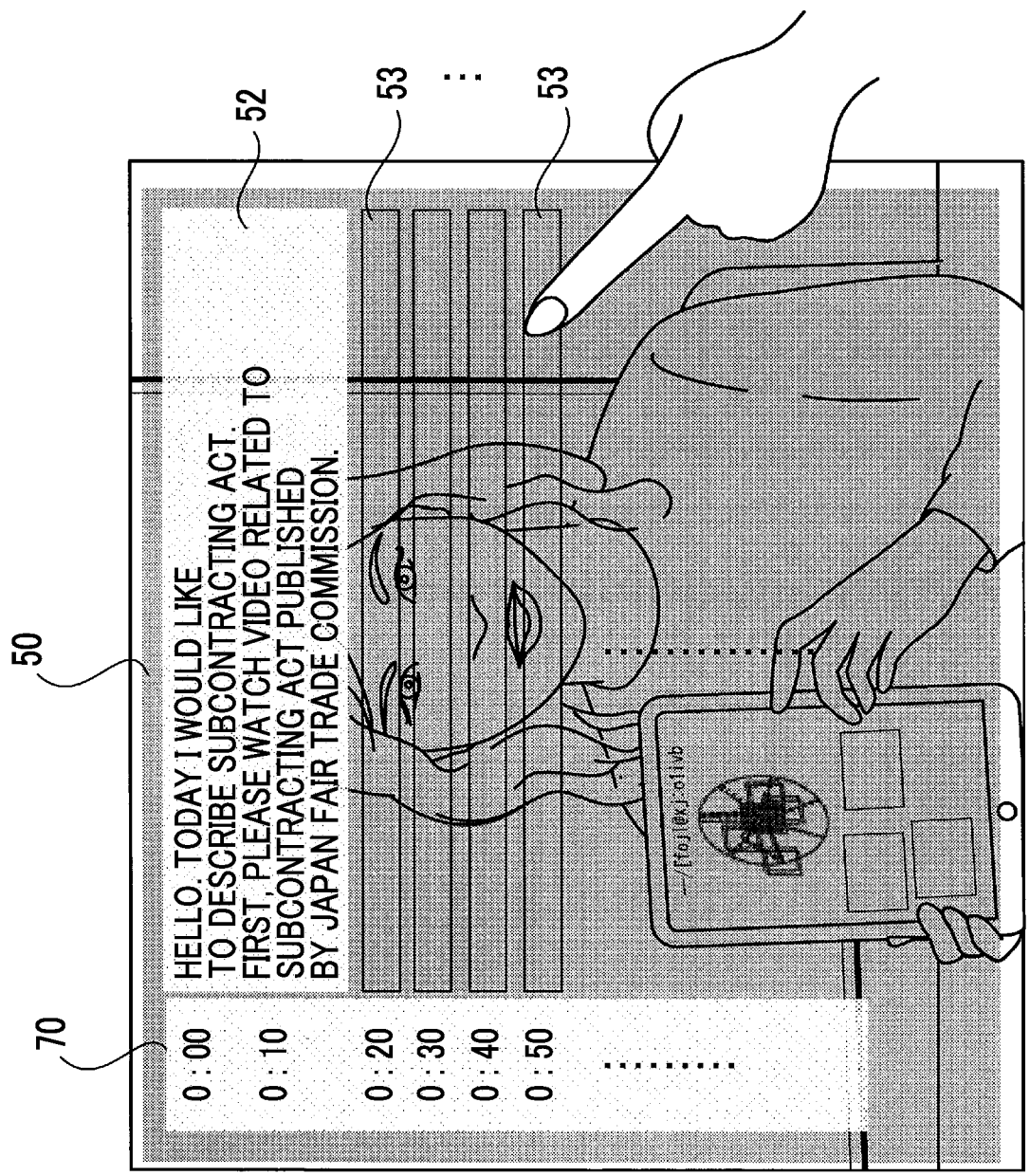

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2019-184288 filed Oct. 7, 2019.

BACKGROUND

(i) Technical Field

The present invention relates to an information processing apparatus and a non-transitory computer readable medium storing a program.

(ii) Related Art

JP6044553B discloses an information processing apparatus including a display control unit that controls display of a display screen including a content display region and a subtitle display region, and an operation recognition unit that, in a case where a first operation with respect to the subtitle display region is detected, recognizes the first operation as an operation for performing a second process different from a first process which is executed when the first operation with respect to the content display region is detected. The first operation is a drag operation, and the second process is a process of changing a playback speed.

JP6217645B discloses an information processing apparatus including a positional change detection unit that detects a positional change of an operated object on a screen, a playback state control unit that controls a playback state of a content, and a display control unit that displays at least a part or the entirety of a text list in which text data associated with an elapsed time of playback of the content is arranged in order of elapsed time on the screen. A continuous positional change of the operated object includes a drag operation in a second axial direction that is movement of the operated object in the second axial direction perpendicular to a first axial direction which is a direction in which the text data of the text list displayed on the screen is arranged. The playback state control unit changes the playback state of the content by different control depending on whether or not the continuous positional change of the operated object detected by the positional change detection unit on the text list displayed by the display control unit is the drag operation in the second axial direction.

SUMMARY

In a case where a subtitle is provided to a motion picture, a list of subtitles may be displayed, and the motion picture may be played back from a location corresponding to a selected subtitle by selecting a corresponding subtitle from the list of subtitles.

In this case, the motion picture may be played back from the location including text information such as the subtitle of the motion picture. However, the motion picture may not be played back from a location not including the text information.

Aspects of non-limiting embodiments of the present disclosure relate to an information processing apparatus and a non-transitory computer readable medium storing a program that are capable of selecting a location not including text information as a playback location of a motion picture in a case where the playback location is selected from a displayed list of the text information provided to the motion picture.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a display control section that performs control for displaying a list of text information provided to a motion picture in a state where a location at which the text information is not provided is also selectable, and a playback section that plays back the motion picture from a playback time point corresponding to a location selected on the displayed list in a case of playing back the motion picture to which the text information is provided.

BRIEF DESCRIPTION OF THE DRAWINGS

Exemplary embodiment(s) of the present invention will be described in detail based on the following figures, wherein:

FIG. 12 is a diagram illustrating one example of the display screen displayed on the terminal apparatus 20.

DETAILED DESCRIPTION

Next, an exemplary embodiment of the present invention will be described in detail with reference to the drawings.

Figure 1:
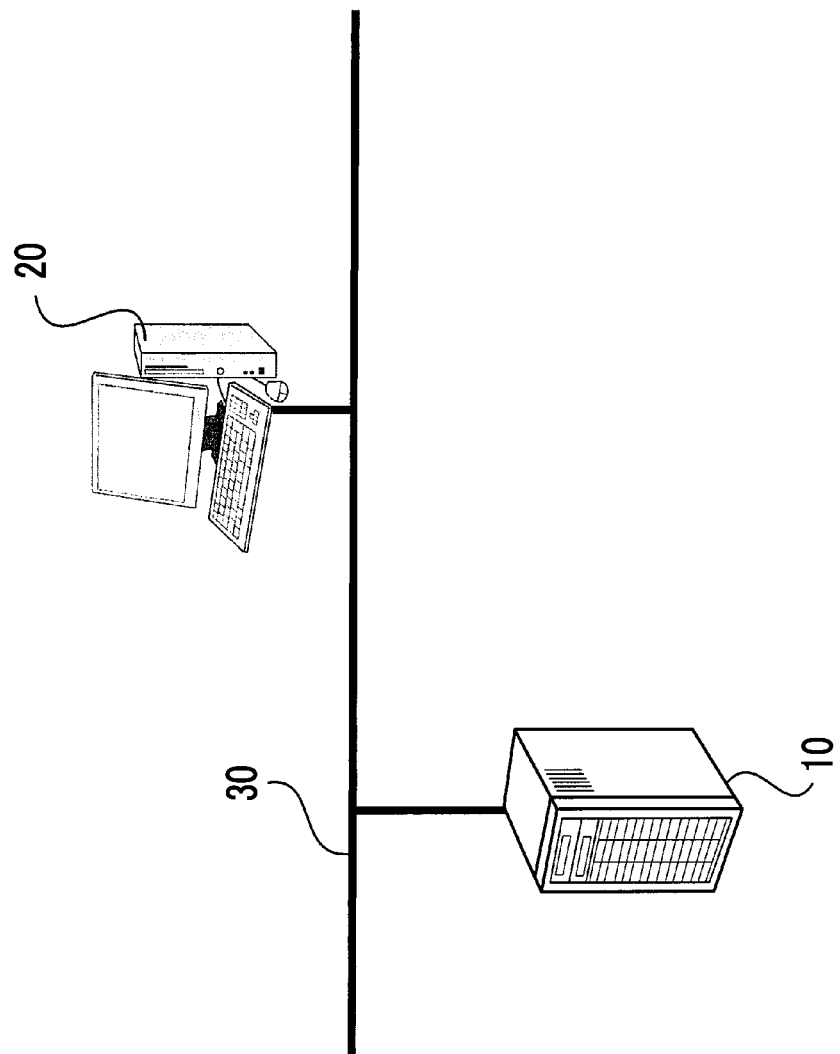
FIG. 1 is a system diagram illustrating a configuration of a multimedia content generation system according to one exemplary embodiment of the present invention.

FIG. 1 is a system diagram illustrating a configuration of a multimedia content generation system according to one exemplary embodiment of the present invention.

As illustrated in FIG. 1, the multimedia content generation system according to one exemplary embodiment of the present invention is configured with an editing processing server 10 and a terminal apparatus 20 such as a personal computer (hereinafter, abbreviated to personal com) connected to each other through a network 30.

The multimedia content generation system of this exemplary embodiment generates a multimedia content into which various contents such as a motion picture, a still picture, a voice, a text, and an automatic translation are combined. According to the multimedia content generation system of this exemplary embodiment, for example, a subtitle may be inserted into the motion picture, and the multimedia content in which the motion picture is played back from a position at which the subtitle is inserted or the motion picture is played back from a position at which the subtitle is not inserted may be generated.

The subtitle refers to a display of information such as an explanation, a conversation, or a translation on a screen of the motion picture such as a movie or a television program using a text. The subtitle may be transmitted and received between the terminal apparatus 20 and the editing processing server 10 as subtitle information.

The editing processing server 10 is an information processing apparatus on which editing software for generating the multimedia content by editing such various contents is installed. The terminal apparatus 20 acquires the motion picture and generates the multimedia content using the editing software operating on the editing processing server 10.

The editing software may not be installed on the editing processing server 10. Instead, the editing software may be directly installed on the terminal apparatus 20 such as a personal com.

Figure 2:
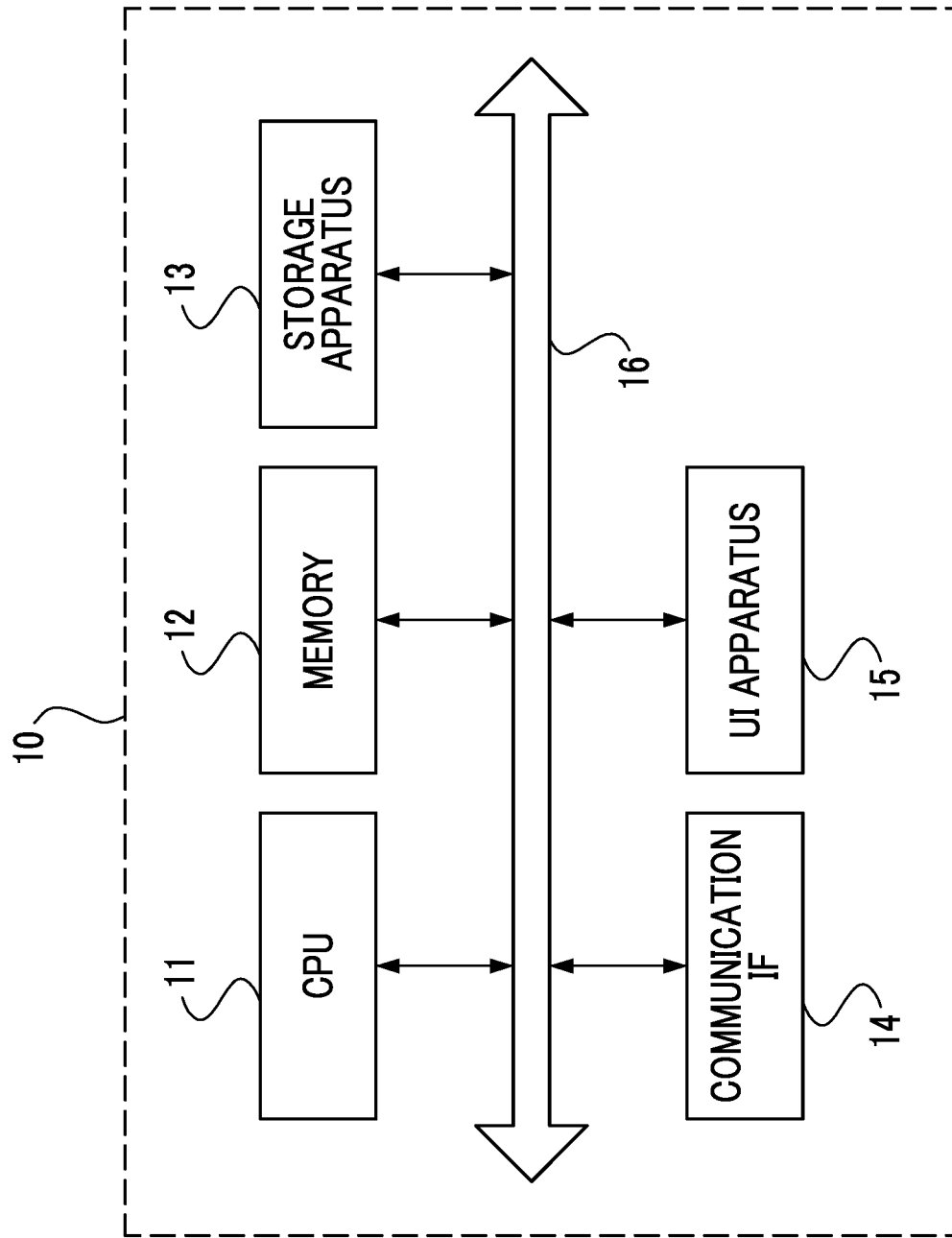
FIG. 2 is a block diagram illustrating a hardware configuration of an editing processing server 10 according to one exemplary embodiment of the present invention.

Next, a hardware configuration of the editing processing server 10 in the multimedia content generation system of this exemplary embodiment is illustrated in FIG. 2.

As illustrated in FIG. 2, the editing processing server 10 includes a CPU 11, a memory 12, a storage apparatus 13 such as a hard disk drive (HDD), a communication interface (IF) 14 transmitting and receiving data to and from an external apparatus or the like such as the terminal apparatus 20 through the network 30, and a user interface (UI) apparatus 15 including a touch panel or a liquid crystal display, and a keyboard. These constituents are connected to each other through a control bus 16.

The CPU 11 controls the operation of the editing processing server 10 by executing a predetermined process based on a control program stored in the memory 12 or the storage apparatus 13. In this exemplary embodiment, the CPU 11 is described as reading and executing the control program stored in the memory 12 or the storage apparatus 13. Alternatively, the program may be stored in a storage medium such as a CD-ROM and provided to the CPU 11.

Figure 3:
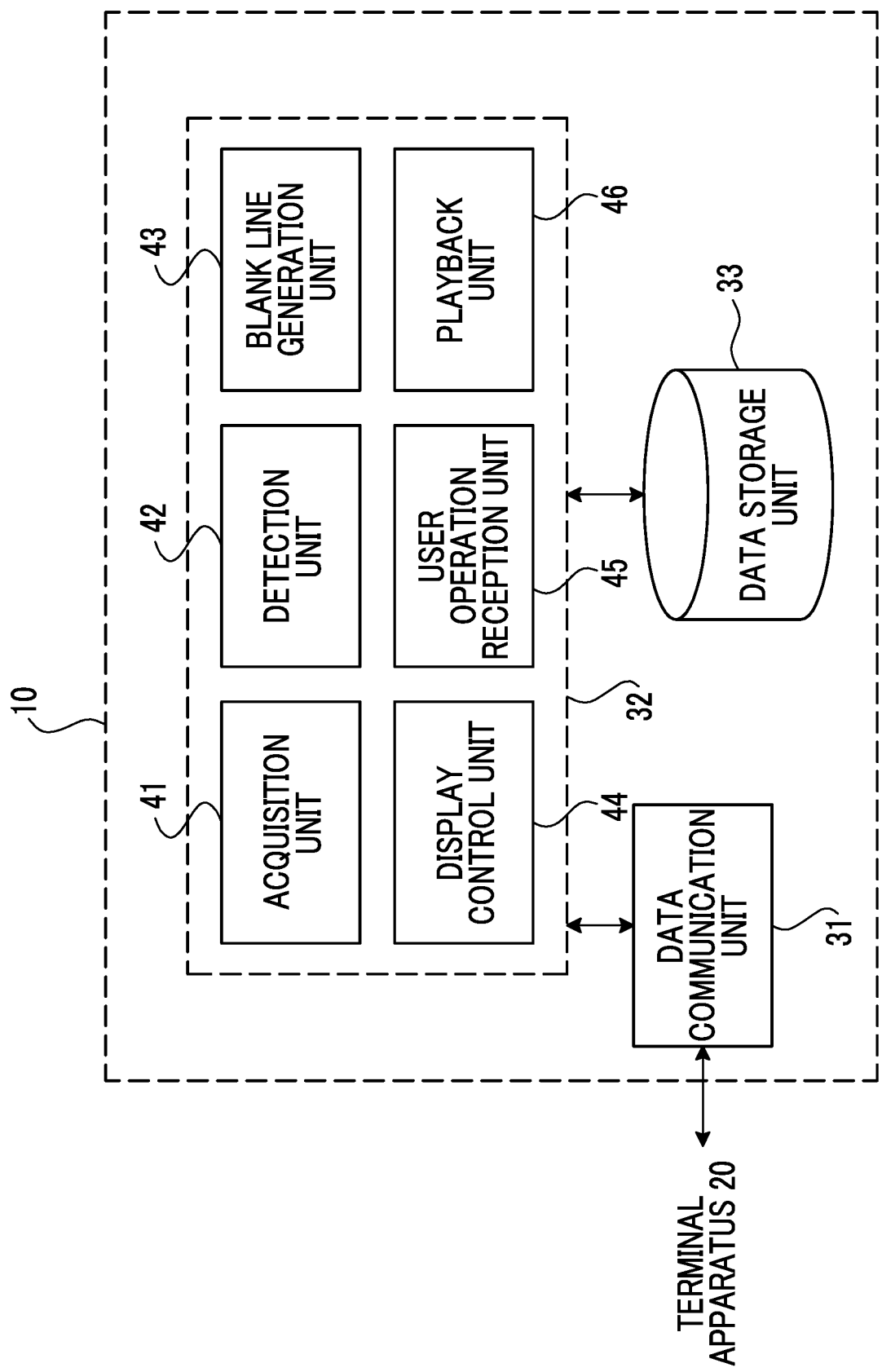
FIG. 3 is a block diagram illustrating a functional configuration of the editing processing server 10 according to one exemplary embodiment of the present invention.

FIG. 3 is a block diagram illustrating a functional configuration of the editing processing server 10 implemented by executing the control program.

As illustrated in FIG. 3, the editing processing server 10 of this exemplary embodiment includes a data communication unit 31, a control unit 32, and a data storage unit 33.

The data communication unit 31 performs data communication with the terminal apparatus 20 through the network 30.

The control unit 32 controls the operation of the editing processing server 10 and includes an acquisition unit 41, a detection unit 42, a blank line generation unit 43, a display control unit 44, a user operation reception unit 45, and a playback unit 46.

The data storage unit 33 stores various content data such as motion picture data on which an editing process is to be performed.

The display control unit 44 controls a screen displayed on the terminal apparatus 20.

The acquisition unit 41 acquires text information from the motion picture. The text information includes the subtitle information provided to the motion picture and background text information included in the motion picture. The background text information is text information included in the motion picture as a background and is, for example, a slide material in the motion picture.

The detection unit 42 detects a section in which the text information is not provided from the motion picture. Specifically, in a case where the section of the motion picture in which the text information is not provided is greater than or equal to a preset value, the detection unit 42 detects the section as a non-text information section. In a case where the section is less than the preset value, the detection unit 42 does not detect the section as the non-text information section. For example, in a case where the section of the motion picture in which the text information is not provided is greater than or equal to 10 seconds, the detection unit 42 detects the section as the non-text information section. In a case where the section is less than 10 seconds, the detection unit 42 does not detect the section as the non-text information section. The section in which the text information is not provided is a time from a subtitle ending time point to a subsequent subtitle starting time point.

The blank line generation unit 43 sets a certain length in time of the non-text information section detected by the detection unit 42 as one line, calculates the number of corresponding blank lines by dividing the detected non-text information section by the length in time of one blank line, and generates blank lines in number corresponding to the calculated number. For example, in a case where the length in time of one blank line is set to 10 seconds and the detected non-text information section is 30 seconds, the blank line generation unit 43 calculates 30=10=3 and generates three blank lines.

That is, the display control unit 44 displays the blank lines in number corresponding to the playback time of the section of the motion picture in which the text information is not provided by inserting the blank lines into a displayed list of text information.

The display control unit 44 performs control for displaying the list of text information by connecting the text information acquired by the acquisition unit 41 to the blank line generated by the blank line generation unit 43. The blank lines function as selection target information that is selectable by the user operation reception unit 45.

That is, the display control unit 44 performs control for displaying the list of text information based on the text information acquired by the acquisition unit 41 and the blank lines in number corresponding to the playback time of the section of the motion picture in which the text information is not provided.

The display control unit 44 performs control for displaying the list of text information provided to the motion picture in a state where a location at which the text information is not provided is also selectable.

The display control unit 44 performs control for displaying the list of text information provided to the motion picture in a state where the location at which the text information is not provided is also selectable by inserting the blank lines corresponding to the section of the motion picture in which the text information is not provided into the list display of text information.

In the case of inserting the blank lines into the displayed list of text information, the display control unit 44 inserts more blank lines into a location at which the subtitle information is not provided in the motion picture and the background text information is changed by greater than or equal to a preset condition than into other locations.

In the case of inserting the blank lines into the displayed list of text information, the display control unit 44 performs control for inserting more blank lines into a location at which the subtitle information is not provided in the motion picture and the scene of the motion picture is changed by greater than or equal to a preset condition than into other locations.

The user operation reception unit 45 receives a location selected by a user on the list of text information provided to the motion picture.

In the case of playing back the motion picture to which the text information is provided, the playback unit 46 plays back the motion picture from a playback time point corresponding to the location received by the user operation reception unit 45 on the displayed list of text information.

Next, the operation of the editing processing server 10 in the multimedia content generation system of this exemplary embodiment will be described in detail with reference to the drawings.

Figure 4:
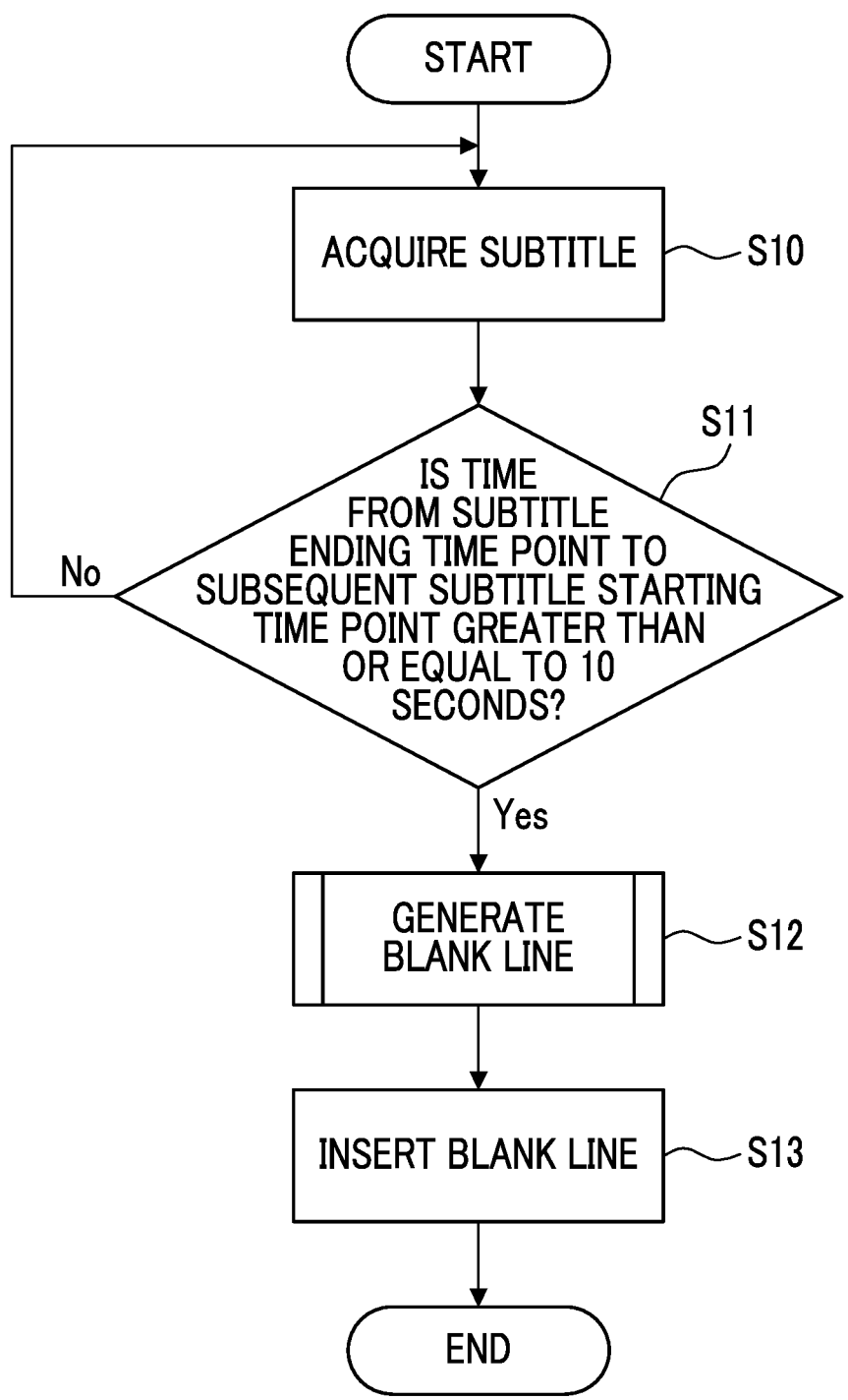
FIG. 4 is a flowchart illustrating a summary of a process in the editing processing server 10 according to one exemplary embodiment of the present invention.
Figure 5:
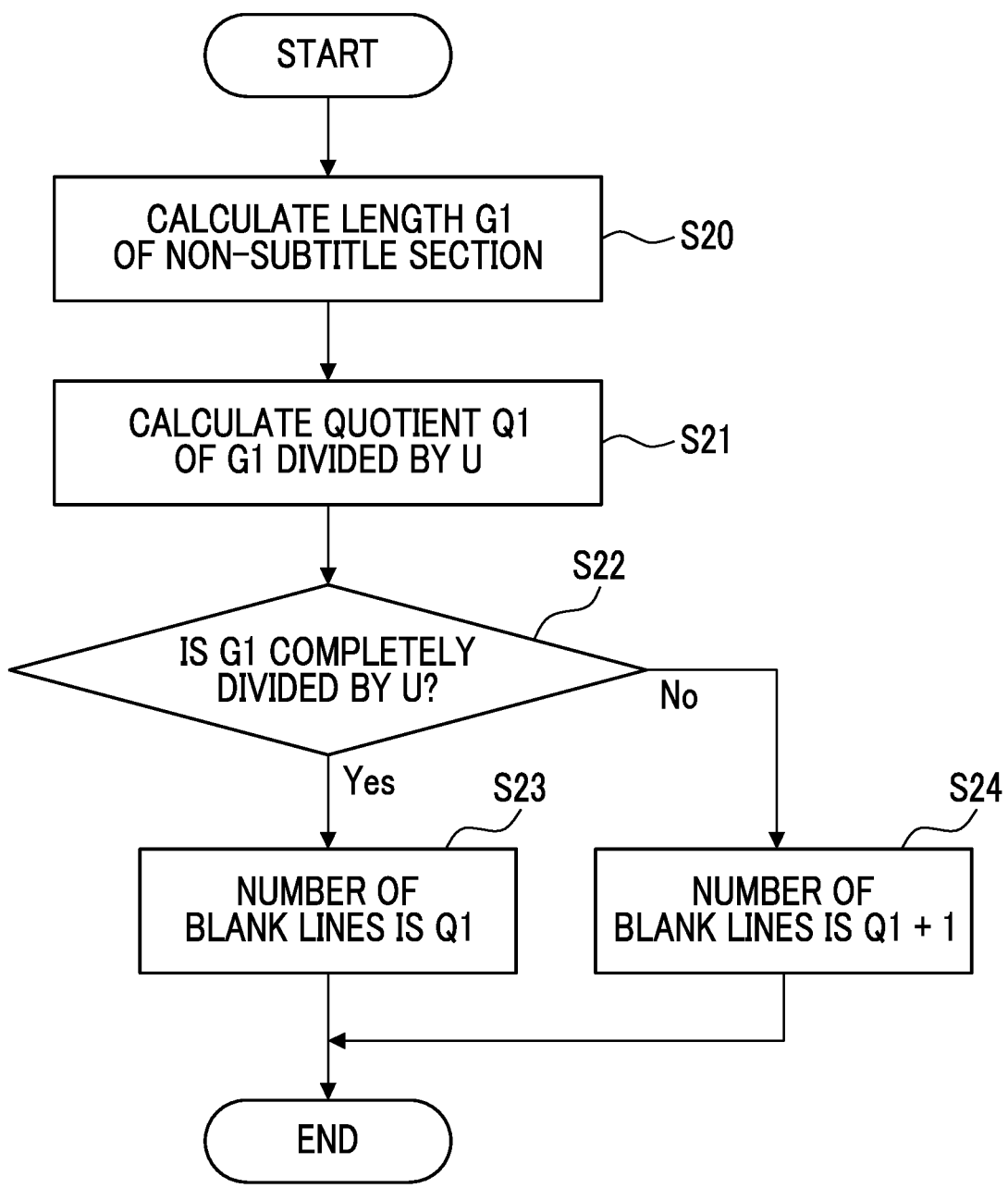
FIG. 5 is a diagram for describing a summary of a blank line generation process in the editing processing server 10 according to one exemplary embodiment of the present invention.

First, a summary of operation in the editing processing server 10 will be described with reference to the flowcharts in FIG. 4 and FIG. 5. Here, a case where the subtitle information provided to the motion picture is acquired from the motion picture as the text information will be described.

First, instep S10, the acquisition unit 41 acquires the subtitle information from the motion picture. Specifically, the subtitle information is acquired from the motion picture to which the subtitle information such as text data is added.

In step S11, the detection unit 42 detects the section in which the subtitle information is not provided from the motion picture. Specifically, the detection unit 42 determines whether or not a time from the subtitle ending time point to the subsequent subtitle starting time point is greater than or equal to 10 seconds. That is, the detection unit 42 determines whether or not the section in which the subtitle information is not provided is greater than or equal to 10 seconds.

In a case where the time from the subtitle ending time point to the subsequent subtitle starting time point is less than 10 seconds, the detection unit 42 returns to the process of step S10.

In a case where the time from the subtitle ending time point to the subsequent subtitle starting time point is greater than or equal to 10 seconds, that is, the section in which the subtitle information is not provided is greater than or equal to 10 seconds, the detection unit 42 performs a blank line generation process, described later, in step S12.

In step S13, the blank line generation unit 43 inserts blank lines in number corresponding to a number calculated in step S12. That is, the display control unit 44 displays the blank lines in number corresponding to the playback time of the section of the motion picture in which the subtitle information is not provided by inserting the blank lines into the displayed list of text information.

Next, the blank line generation process of step S12 will be described.

First, in step S20, the blank line generation unit 43 calculates a length G1 of a non-subtitle section that is detected by the detection unit 42 and in which the subtitle information is not provided. Specifically, the time G1 from the subtitle ending time point to the subsequent subtitle starting time point is calculated.

In step S21, the blank line generation unit 43 calculates a quotient Q1 of the length G1 of the non-subtitle section divided by a length U per blank line.

In step S22, whether or not the length G1 of the non-subtitle section is completely divided by the length U per blank line is determined.

In a case where the divisibility determination in step S22 is positive, the number of blank lines is determined to be Q1 in step S23, and a transition is made to the process of step S13.

In a case where the divisibility determination in step S22 is negative, the number of blank lines is determined to be Q1+1 in step S24, and a transition is made to the process of step S13.

Next, operations on the display screen of the terminal apparatus 20 will be described using FIG. 6 to FIG. 9.

Figure 6:
FIG. 6 is a diagram illustrating one example of a display screen displayed on a terminal apparatus 20.

As illustrated in FIG. 6, a subtitle region 50 displaying the subtitle information or the like is displayed in the lower part of the display screen of the terminal apparatus 20.

Figure 7:
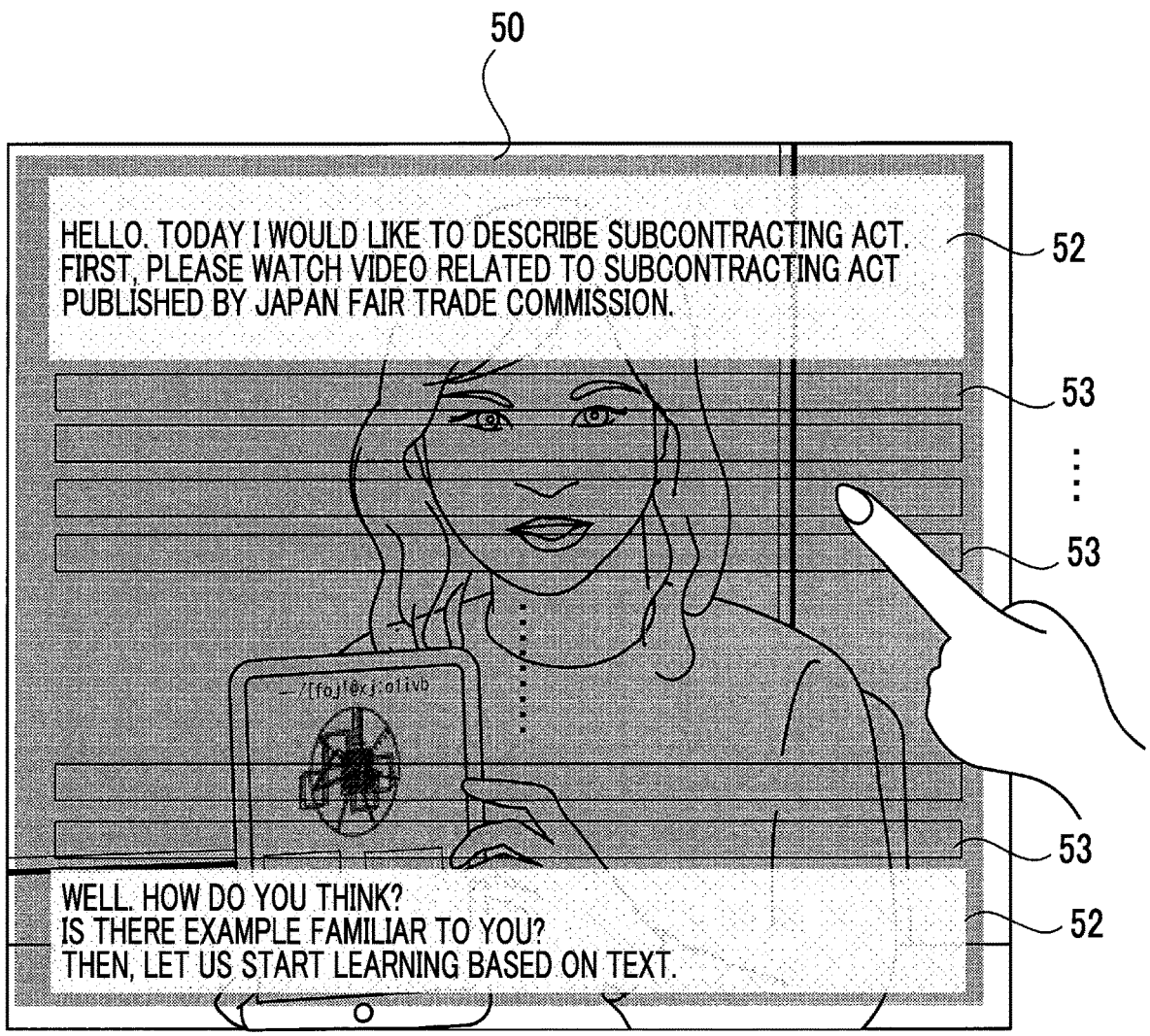
FIG. 7 is a diagram illustrating one example of the display screen displayed on the terminal apparatus 20.

In a case where the subtitle region 50 is tapped, playback of the motion picture is temporarily stopped, and the subtitle region 50 expands in the vertical direction as illustrated in FIG. 7. The subtitle region 50 may expend to the entire region of the display screen of the terminal apparatus 20. The subtitle region 50 is displayed in overlay on the motion picture with a certain degree of transparency in which the motion picture below is visually recognizable. Tapping refers to an operation of touching the display screen with a finger or the like such as lightly hitting the display screen with a finger, a touch pen, or the like.

As illustrated in FIG. 7, in the subtitle region 50, a list of text information in which subtitle information 52 acquired by the acquisition unit 41 and blank lines 53 generated by the blank line generation unit 43 are connected in time series is displayed. That is, the non-subtitle section is displayed as the blank lines 53. The blank lines 53 in number corresponding to the playback time of the non-subtitle section are displayed by inserting the blank lines 53 into the displayed list of text information. The blank lines 53 are used as the selection target information corresponding to the non-subtitle section. That is, playback may be started from an intended position of the non-subtitle section by selecting the blank line 53. The subtitle region 50 is displayed in overlay on the motion picture with transparency. Thus, playback may be started from the intended position by checking a thumbnail of the motion picture.

In the temporary stoppage state, a subsequent list of text information is displayed by swiping upward in the subtitle region 50, and a previous list of text information is displayed by swiping downward in the subtitle region 50. Swiping refers to an operation of sliding a finger or the like in a state of touching on the display screen.

The motion picture may be played back from a playback position corresponding to tapped subtitle information by tapping a predetermined position of the subtitle information 52 on the list of text information displayed in the subtitle region 50.

Figure 8:
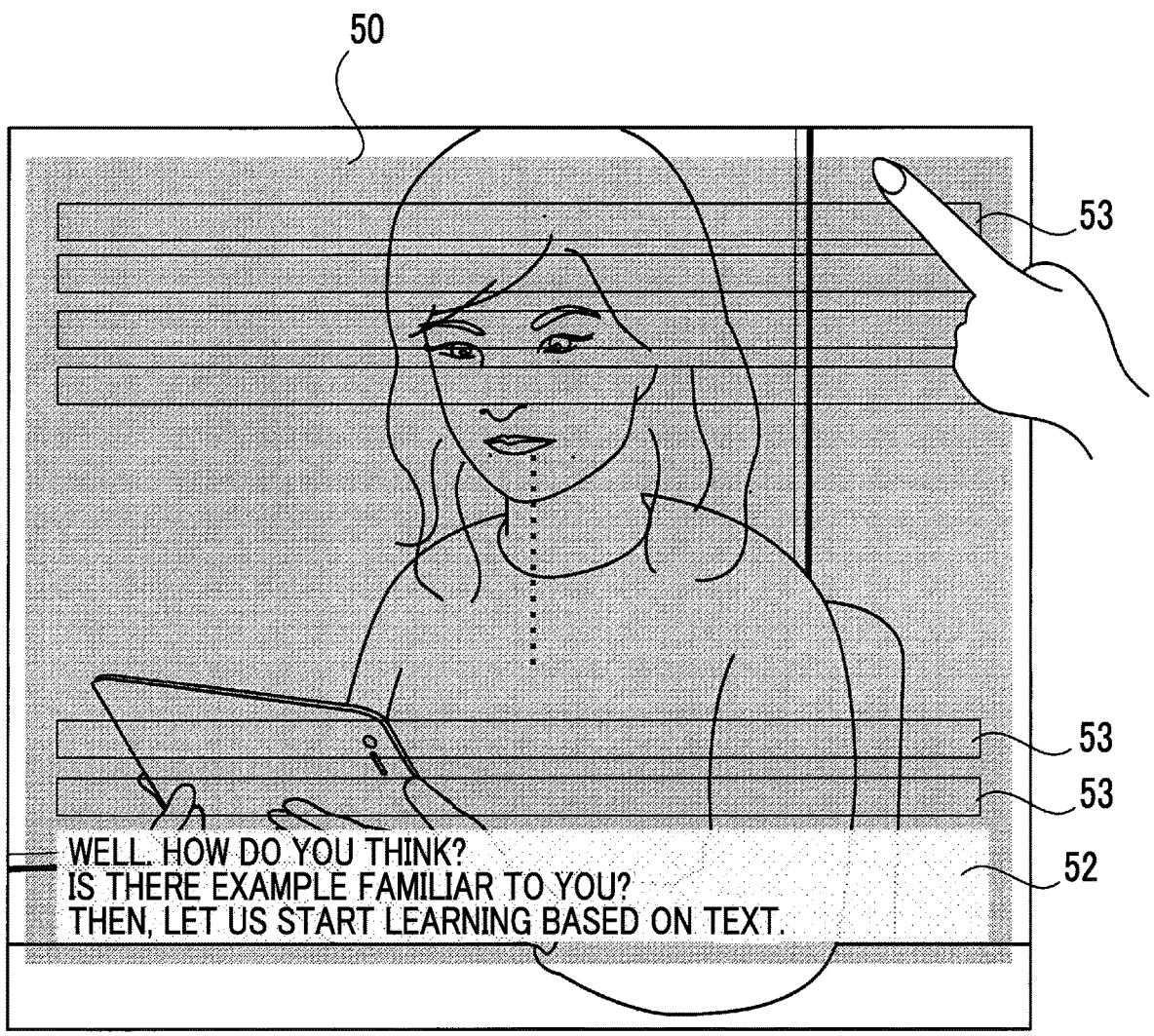
FIG. 8 is a diagram illustrating one example of the display screen displayed on the terminal apparatus 20.

The motion picture may be played back from a playback position corresponding to a tapped blank line as illustrated in FIG. 8 by selecting and tapping the blank line 53 on the list of text information displayed in the subtitle region 50.

Figure 9:
FIG. 9 is a diagram illustrating one example of the display screen displayed on the terminal apparatus 20.

In the temporary stoppage state, the subtitle region 50 may be reduced to a preset size as illustrated in FIG. 9, and the motion picture may be played back from a tapped position by tapping any position in the subtitle region 50 as illustrated in FIG. 8. That is, even in the section not having the subtitle information 52, the reduced subtitle region 50 is displayed on the display screen of the terminal apparatus 20, and the list of text information may be displayed by tapping the subtitle region 50.

That is, the motion picture may be played back from a location including the subtitle information, and the motion picture may also be played back from a location not including the subtitle information.

Next, operations on the display screen of the terminal apparatus 20 in a case where the background text information is included in the motion picture as the text information will be described using FIG. 10 and FIG. 11.

Figure 10:
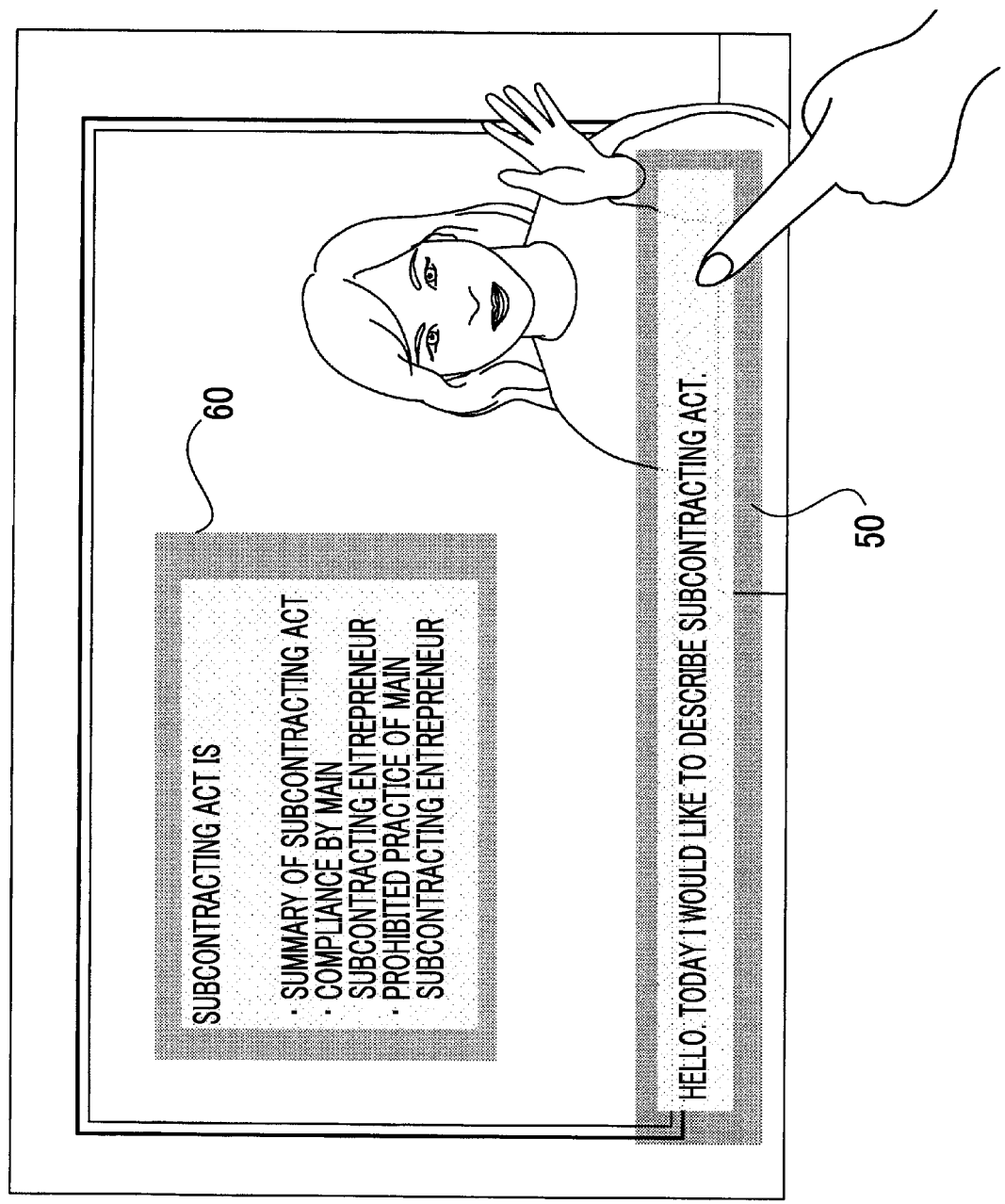
FIG. 10 is a diagram illustrating one example of the display screen displayed on the terminal apparatus 20.

As illustrated in FIG. 10, in a case where the motion picture is a lecture or the like that is provided using a slide material, a whiteboard, or the like, the background text information is included in the motion picture as the text information.

The subtitle region 50 including the subtitle information is displayed in the lower part of the display screen of the terminal apparatus 20. In addition, a text region 60 including the background text information is displayed on the display screen of the terminal apparatus 20. The subtitle region 50 and the text region 60 are displayed in overlay on the motion picture with a certain degree of transparency in which the motion picture below is visually recognizable.

Figure 11:
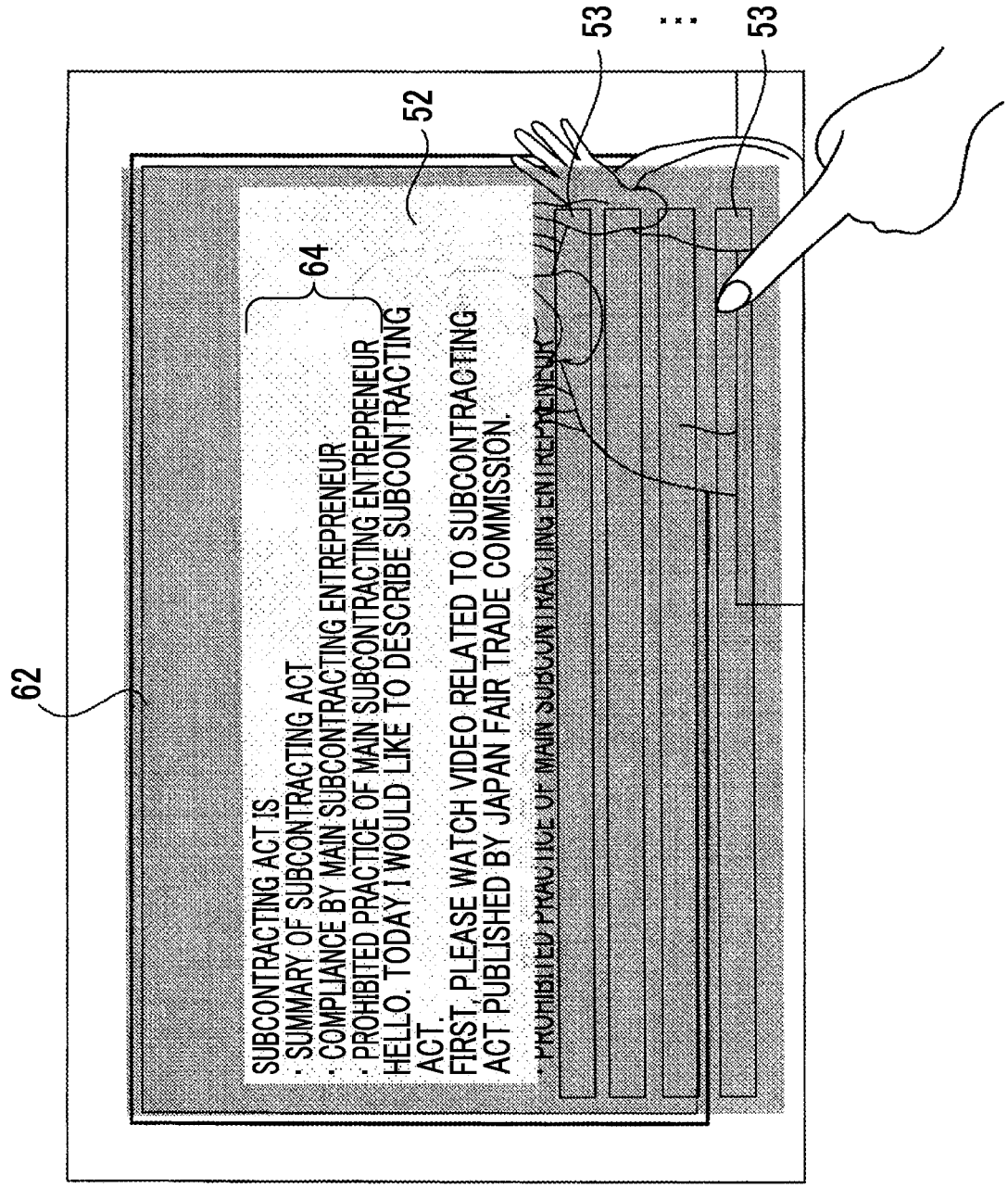
FIG. 11 is a diagram illustrating one example of the display screen displayed on the terminal apparatus 20.

In a case where the subtitle region 50 or the text region 60 is tapped, playback of the motion picture is temporarily stopped, and a subtitle text region 62 including the subtitle region 50 and the text region 60 is displayed on the entire region of the display screen of the terminal apparatus 20 as illustrated in FIG. 11.

In the subtitle text region 62, a list of text information in which background text information 64 acquired by the acquisition unit 41, the subtitle information 52 acquired by the acquisition unit 41, and the blank lines 53 generated by the blank line generation unit 43 are connected in time series is displayed. That is, the non-subtitle section is displayed as the blank lines 53. The blank lines 53 in number corresponding to the playback time of the non-subtitle section are displayed by inserting the blank lines 53 into the displayed list of text information. The blank lines 53 are used as the selection target information corresponding to the non-subtitle section. That is, playback may be started from an intended position of the non-subtitle section by selecting the blank line 53.

In the temporary stoppage state, the subsequent list of text information is displayed by swiping upward in the subtitle text region 62, and the previous list of text information is displayed by swiping downward in the subtitle text region 62.

The motion picture may be played back from a playback position corresponding to tapped subtitle information or background text information by tapping a predetermined position of the subtitle information 52 or the background text information 64 on the list of text information displayed in the subtitle text region 62.

The motion picture may be played back from a playback position corresponding to a tapped blank line by selecting and tapping the blank line 53 on the list of text information displayed in the subtitle text region 62.

That is, the motion picture may be played back from a location including the text information such as the subtitle information or the background text information, and the motion picture may also be played back from a location not including the text information.

In the case of inserting the blank lines into the displayed list of text information, the blank line generation unit 43 inserts more blank lines into a location at which the subtitle information is not provided in the motion picture and the background text information is changed by greater than or equal to the preset condition than into other locations. Specifically, for example, more blank lines, for example, five lines, are inserted into a location at which the background text information such as a slide or a material is switched than into other locations. Accordingly, in the case of playing back the motion picture, the user may play back the motion picture from a switching timing of a page such as a slide or a material.

In the case of inserting the blank lines into the displayed list of text information, the blank line generation unit 43 inserts more blank lines into a location at which the subtitle information is not provided in the motion picture and the scene of the motion picture is changed by greater than or equal to the preset condition than into other locations. Specifically, for example, more blank lines, for example, five lines, are inserted into a location at which the lecture is finished and a lecturer is switched than into other locations. Accordingly, in the case of playing back the motion picture, the user may play back the motion picture from a switching timing of the lecturer.

FIG. 12 is a diagram illustrating a modification example of the list of text information displayed in the subtitle region 50.

As illustrated in FIG. 12, in the subtitle region 50, a time position 70 corresponding to each of the subtitle information 52 and the blank lines 53 is displayed. That is, the motion picture may be played back from the time position 70 including the subtitle information 52 of the motion picture, and the motion picture may also be played back from the time position 70 of the blank line 53 not including the subtitle information 52. That is, a position at which playback is intended may be checked as time.

While this exemplary embodiment is described using a case where the subtitle information provided to the motion picture is acquired, the present invention is not limited to the exemplary embodiment and may be applied in the same manner to a case where the subtitle information is acquired by performing voice recognition on the voice of the motion picture.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor, configured to:
perform control for displaying a list of text information provided to a motion picture in a state where a location at which the text information is not provided is also selectable by inserting selection target information corresponding to a section of the motion picture in which the text information is not provided into the displayed list of text information, and displaying a blank line in number corresponding to a playback time of the section of the motion picture in which the text information is not provided as the selection target information by inserting the blank line into the displayed list of text information; and play back the motion picture from a playback time point corresponding to a location selected on the displayed list in a case of playing back the motion picture to which the text information is provided.

2. The information processing apparatus according to claim 1, wherein the processor displays the selection target information in number corresponding to a playback time of the section of the motion picture in which the text information is not provided by inserting the selection target information into the displayed list of text information.

3. The information processing apparatus according to claim 1, wherein the text information includes subtitle information provided to the motion picture and background text information included in the motion picture.

4. The information processing apparatus according to claim 3, wherein in a case of inserting the selection target information into the displayed list of text information, the processor inserts more selection target information into a location at which the subtitle information is not provided in the motion picture and the background text information is changed by greater than or equal to a preset condition than into other locations.

5. The information processing apparatus according to claim 3, wherein in a case of inserting the selection target information into the displayed list of text information, the processor inserts more selection target information into a location at which the subtitle information is not provided in the motion picture and a scene of the motion picture is changed by greater than or equal to a preset condition than into other locations.

6. A non-transitory computer readable medium storing a program causing a computer to execute:

performing control for displaying a list of text information provided to a motion picture in a state where a location at which the text information is not provided is also selectable by inserting selection target information corresponding to a section of the motion picture in which the text information is not provided into the displayed list of text information, and displaying a blank line in number corresponding to a playback time of the section of the motion picture in which the text information is not provided as the selection target information by inserting the blank line into the displayed list of text information; and playing back the motion picture from a playback time point corresponding to a location selected on the displayed list in a case of playing back the motion picture to which the text information is provided.

7. An information processing apparatus comprising:

display control means for performing control for displaying a list of text information provided to a motion picture in a state where a location at which the text information is not provided is also selectable by inserting selection target information corresponding to a section of the motion picture in which the text information is not provided into the displayed list of text information, and displaying a blank line in number corresponding to a playback time of the section of the motion picture in which the text information is not provided as the selection target information by inserting the blank line into the displayed list of text information; and playback means for playing back the motion picture from a playback time point corresponding to a location selected on the displayed list in a case of playing back the motion picture to which the text information is provided.

* * * * *